United States Patent
Wang et al.

(10) Patent No.: US 7,043,403 B1
(45) Date of Patent: May 9, 2006

(54) FAULT DETECTION AND CLASSIFICATION BASED ON CALCULATING DISTANCES BETWEEN DATA POINTS

(75) Inventors: Jin Wang, Austin, TX (US); Gregory A. Cherry, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 603 days.

(21) Appl. No.: 10/234,755

(22) Filed: Sep. 4, 2002

(51) Int. Cl.
*G06F 19/00* (2006.01)

(52) U.S. Cl. .................. 702/185; 702/182; 702/183
(58) Field of Classification Search ............ 700/28–30, 700/51, 67, 95, 108–110; 702/182–185
See application file for complete search history.

(56) References Cited

U.S. PATENT DOCUMENTS

| | | | | |
|---|---|---|---|---|
| 4,937,763 | A | * | 6/1990 | Mott .......................... 702/183 |
| 5,351,247 | A | * | 9/1994 | Dow et al. ................... 714/26 |
| 5,949,678 | A | * | 9/1999 | Wold et al. ................... 700/83 |
| 6,192,287 | B1 | * | 2/2001 | Solomon et al. ............ 700/110 |
| 6,442,542 | B1 | * | 8/2002 | Ramani et al. ................ 707/3 |
| 6,804,563 | B1 | * | 10/2004 | Lafaye de Micheaux ..... 700/51 |
| 6,865,509 | B1 | * | 3/2005 | Hsiung et al. .............. 702/182 |
| 6,885,977 | B1 | * | 4/2005 | Gavra et al. ................ 702/185 |

OTHER PUBLICATIONS

P. E. Hart, May 1968 issue of IEEE Transactions of Information Theory, pf 515.*
Jack E. Mott, Proceedings of the SEMATECH AEC/APC Workshop IX, Lake Tahoe, NV. Sep. 20-24, 1997, pp. 447-458. Triant Technologies.*

* cited by examiner

*Primary Examiner*—Patrick J. Assouad
(74) *Attorney, Agent, or Firm*—Williams, Morgan & Amerson, P.C.

(57) ABSTRACT

A method and apparatus is provided for fault detection and classification based on calculating distances between data points. The method comprises receiving a data sample representative of measurements of one or more variables associated with a process operation, determining a distance between the data sample and one or more data points of a history data of the process operation and detecting a fault associated with the process operation based on the distance between the data sample and the one or more data points of the history data.

27 Claims, 5 Drawing Sheets

FAULT DETECTION AND CLASSIFICATION BASED ON CALCULATING DISTANCES BETWEEN DATA POINTS

BACKGROUND OF THE INVENTION

1. Field of the Invention

This invention relates generally to an industrial process, such as a semiconductor manufacturing process, a photographic process or a chemical process. More particularly, the invention relates to detecting and classifying faults in the industrial process based on calculating distances between data points.

2. Description of the Related Art

There is a constant drive to increase the quality, reliability, and throughput of industrial processes, which may include, but are not limited to, semiconductor manufacturing processes, photography processes, and/or chemical processes. In an effort to improve the overall process, the trend has been to measure and record more process variables than before, variables such as temperature, pressure, and concentrations of gas mixtures or chemical agents, and to use those measured variables in controlling the process.

The amount of data that is collected for a given process increases as a greater number of variables are measured (or monitored) and as the frequency of those measurements is increased. For some processes, particularly in the chemical field, more than a hundred variables may be monitored at any given time, and, as such, large amounts of data that are associated with these processes may be collected for later analysis.

Analyzing large amounts of collected data, however, poses a challenge because of the processing power or resources that are required to process the data, possibly within a specified amount of time. Because of limited processing capabilities and/or time constraints, users often times choose and analyze only a selective subset of variables that are considered to be more important, while ignoring the other variables. However, excluding measured variables that are not considered to be desirable by users may result in the loss of valuable information, particularly from the standpoint of fault detection and classification. Relying on incomplete data may result in false fault detection or misclassification. As a result, processing efficiencies may be reduced.

The present invention is directed to overcoming, or at least reducing the effects of, one or more of the problems set forth above.

SUMMARY OF THE INVENTION

In one embodiment of the present invention, a method is provided for fault detection and classification based on calculating distances between data points. The method comprises receiving a data sample representative of measurements of one or more variables associated with a process operation, determining a distance between the data sample and one or more data points of a history data of the process operation and detecting a fault associated with the process operation based on the distance between the data sample and the one or more data points of the history data.

In another embodiment of the present invention, an apparatus is provided for fault detection and classification based on calculating distances between data points. The apparatus comprises an interface and a controller, which is coupled to the interface. The interface is adapted to receive a data sample representative of one or more variables measured in a process operation. The controller is adapted to determine a distance between the data sample and one or more data points of a history data of the process operation and detect a fault associated with the process operation based on the distance between the data sample and the one or more data points of the history data.

In a further embodiment of the present invention, an article comprising one or more machine-readable storage media containing instructions is provided for fault detection and classification based on calculating distances between data points. The one or more instructions, when executed, enable the processor to receive a data sample representative of measurements of variables that are associated with a process operation, perform principal component analysis on the data sample to determine a score and a residual value and determine a score of a history data that is nearest to the score of the data sample, wherein the history data is associated with the process operation. The one or more instructions, when executed, further enable the processor to determine an operating condition associated with the score that is nearest to the score of the data sample and detect a fault associated with the process operation based on the determined operating condition.

In a further embodiment of the present invention, a system is provided for fault detection and classification based on calculating distances between data points. The system comprises a processing tool and a fault detection and classification unit. The processing tool is adapted to perform a process operation. The fault detection and classification unit is adapted to receive a data sample representative of one or more variables measured in the process operation, determine a distance between the data sample and one or more data points of a history data of the process operation and detect a fault associated with the process operation based on the distance between the data sample and the one or more data points of the history data.

BRIEF DESCRIPTION OF THE DRAWINGS

The invention may be understood by reference to the following description taken in conjunction with the accompanying drawings, in which like reference numerals identify like elements, and in which.

Figure 1:
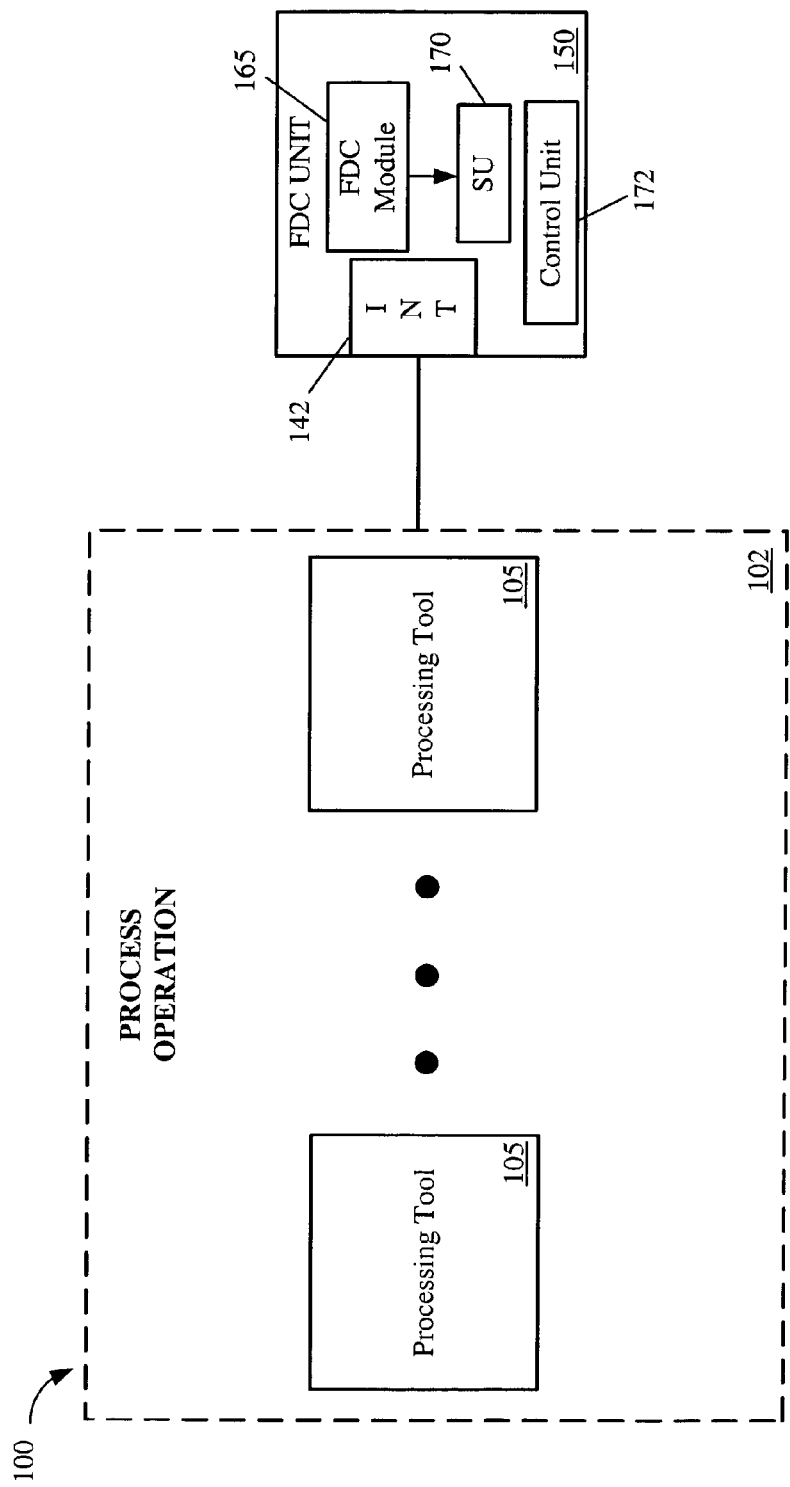
FIG. 1 illustrates a block diagram of an industrial system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a block diagram of a system 100 is illustrated, in accordance with one embodiment of the present invention. The system 100 in the illustrated embodiment is capable of performing an industrial process, such as a semiconductor fabrication process, a photographic process, a chemical process, or any other process in which a plurality of variables, such as temperature, tool parameters, pressure level and chemical compositions, and the like may be monitored and analyzed. The variables may be monitored and analyzed, for example, to detect faults and/or classify the detected faults.

In the system 100, at least one process operation 102 may be performed using one or more processing tools 105. The particular type of process operation 102 that is performed, and the type of processing tool(s) 105 employed in that process operation 102, depends on the particular implementation. For example, in the context of a chemical industrial process, the process operation 102 may include processing a polymer. As an additional example, in the context of a photographic process, the process operation 102 may include processing a film.

In another example, the process operation 102 may be part of a semiconductor process flow, and, as such, the processing tool 105 may take the form of any semiconductor fabrication equipment used to produce a processed workpiece, such as a silicon wafer. The semiconductor process may be utilized to produce a variety of integrated circuit products including, but not limited to, microprocessors, memory devices, digital signal processors, application specific integrated circuits (ASICs), or other similar devices. An exemplary processing tool 105 may include an exposure tool, an etch tool, a deposition tool, a polishing tool, a rapid thermal anneal processing tool, a metrology tool, a test-equipment tool, an ion implant tool, a packaging tool and the like. It should be appreciated that the processing tool 105 need not necessarily be limited to processing silicon wafers, but may produce a variety of different types of commercial products without departing from the spirit and scope of the present invention.

The system 100 illustrated in FIG. 1 includes a fault detection and classification (FDC) unit 150 that is in communication with one or more processing tools 105 of the process operation 102 through an interface 142. The interface 142 may be any acceptable structure(s) that allow(s) the FDC unit 150 to communicate with other devices. The FDC unit 150 includes a fault detection and classification (FDC) module 165, described in greater detail below, which is storable in a storage unit (SU) 170. The fault detection and classification module 165 in the illustrated embodiment is implemented in software. In other embodiments, the fault detection and classification module 165 may be implemented in hardware or firmware. In the illustrated embodiment, the FDC unit 150 includes a control unit 172 for managing the overall operations and executing one or more software applications resident in the storage unit 170.

Faults may occur in the process operation 102 for various reasons, including occurrence of an unknown disturbance, hardware failure, depletion of resources (e.g., gases, liquids, chemicals), mis-processing, and the like. The faults may be detected in several ways, including based on data provided by the processing tool(s) 105 of the process operation 102 or metrology data provided from the process operation 102.

In accordance with one or more embodiments of the present invention, the FDC module 165, using the nearest neighbor rule (NNR), detects faults associated with the process operation 102 and then classifies the detected faults, as is described more fully below. In another embodiment, to reduce the computation required for fault detection and classification, a principal component analysis (PCA) is applied to process data before the application of the nearest neighbor rule. Both the NNR and PCA algorithms are well known to those skilled in the art, and thus are not discussed in detail herein.

It should be understood that the illustrated components shown in the block diagram of the system 100 in FIG. 1 are illustrative only, and that, in alternative embodiments, additional or fewer components may be utilized without deviating from the spirit or scope of the invention. For example, in one embodiment, the system 100 may include an Advanced Process Control (APC) framework (not shown) positioned intermediate the processing tool(s) 105 and the FDC unit 150. Furthermore, the system 100 may include one or more control units (not shown) that calculate parameters of a recipe that controls the processing tool(s) 105. In one embodiment, the control units may continually update recipe parameters to aid the processing tool(s) 105 towards performing a desired process in the processing tool(s) 105 to thereby achieve a desired result.

In one embodiment, the control units may be part of the APC framework. An exemplary APC framework that may be suitable for use in the system 100 may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

Figure 2:
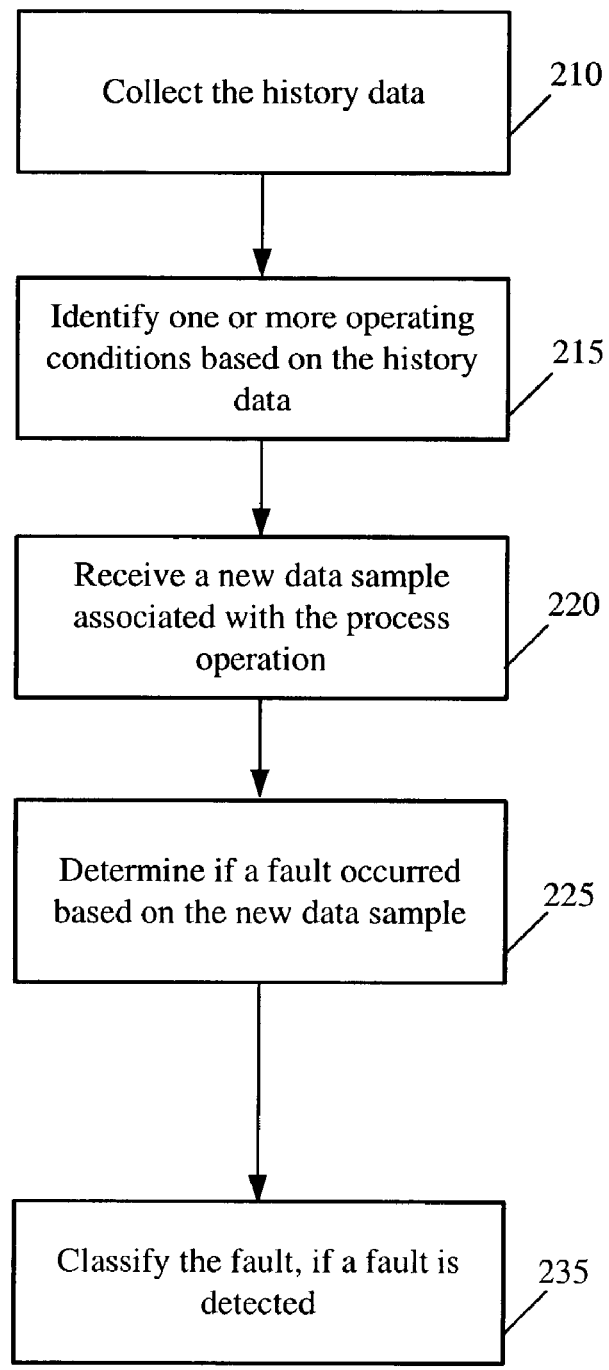
FIG. 2 depicts a flow diagram of a method that may be implemented in the system of FIG. 1, in accordance with one embodiment of the present invention.

Referring now to FIG. 2, a flow diagram of a method that may be implemented in the system 100 of FIG. 1 is illustrated, in accordance with one embodiment of the present invention. The FDC module 165 collects (at 210) history data associated with the process operation 102. The history data, for example, may have been previously collected over time through measurements of a variety of variables relating to the processing of workpieces in the process operation 102 (or similar other operations), where it was known that such operation(s) operated within acceptable operational limits. The particular type and number of variables that are measured are implementation specific.

The history data can be a collection of numerous data points, where each data point may be representative of multiple variables that are measured or monitored in the process operation 102. Examples of types of variables that may be measured include temperature, pressure, and concentrations of gas mixtures or chemical agents employed in the process operation 102, and the like. In one embodiment, variables relating to the operating conditions of selected components (e.g., heating elements, chambers) of the processing tool(s) 105 of the processing operation 102 may also be measured. In yet another embodiment, variables relating to the physical characteristics (e.g., thickness of the deposited material, critical dimensions, etching end points) of the processed workpieces may also be measured. In a multivariate process, it is not uncommon to measure hundreds of variables and collect thousands of data samples.

Based on the collected history data (at 210), one or more operating conditions are identified (at 215). That is, numerous data points in the history data may generally reflect some patterns that are indicative of various operating conditions of the process operation 102. For example, a "normal" operating condition may be reflected by a first group of data points that, based on their values, are present in roughly the same region, while another group of data points representative of a faulty operating condition may be clustered in a different region. Thus, based generally on the value of one or more data points of the history data, one or more operating conditions may be identified (at 215).

The acts of collecting history data (at 210) and identifying one or more operating conditions based on the history data (at 215) of FIG. 2 are generally performed before the process operation 102 is performed, although the present invention is not and should not be considered as limited to performing these acts in this particular sequence. Thus, once the history data has been collected (at 210) and the one or more operating conditions identified (at 215), the FDC module 165 is capable of detecting and classifying faults that are associated with the process operation 102 in a manner described below.

For illustrative purposes of the method of FIG. 2, it is herein assumed that the history data represents three different operating conditions: a "normal," "fault type-I," and a "fault type-II" operating condition. The "normal" operating condition represents a condition in which the process operation 102 generally performs as desired (i.e., produces results within specification or an acceptable range). The "fault" operation condition, on the other hand, may be representative, for example, of a particular type of fault associated with the process operation 102. It should be understood that in one embodiment, the history data may represent only a "normal" operating condition, but no faulty operating condition.

In the method of FIG. 2, the FDC module 165 receives (at 220) a new data sample (or point) associated with the process operation 102. That is, as (or after) the process operation 102 is performed, the desired variables are measured and a new data sample representative of the measured variables is provided to the FDC module 165. The new data sample, in the illustrated embodiment, is a vector.

The FDC module 165, based on the received new data sample, determines (at 225) if a fault occurred in the process operation 102, and, if a fault is detected, then the FDC module 165 classifies (at 230) the detected fault. The acts of determining whether a fault occurred (at 225) and classifying the detected fault (at 230) are described in greater detail below.

Figure 3:
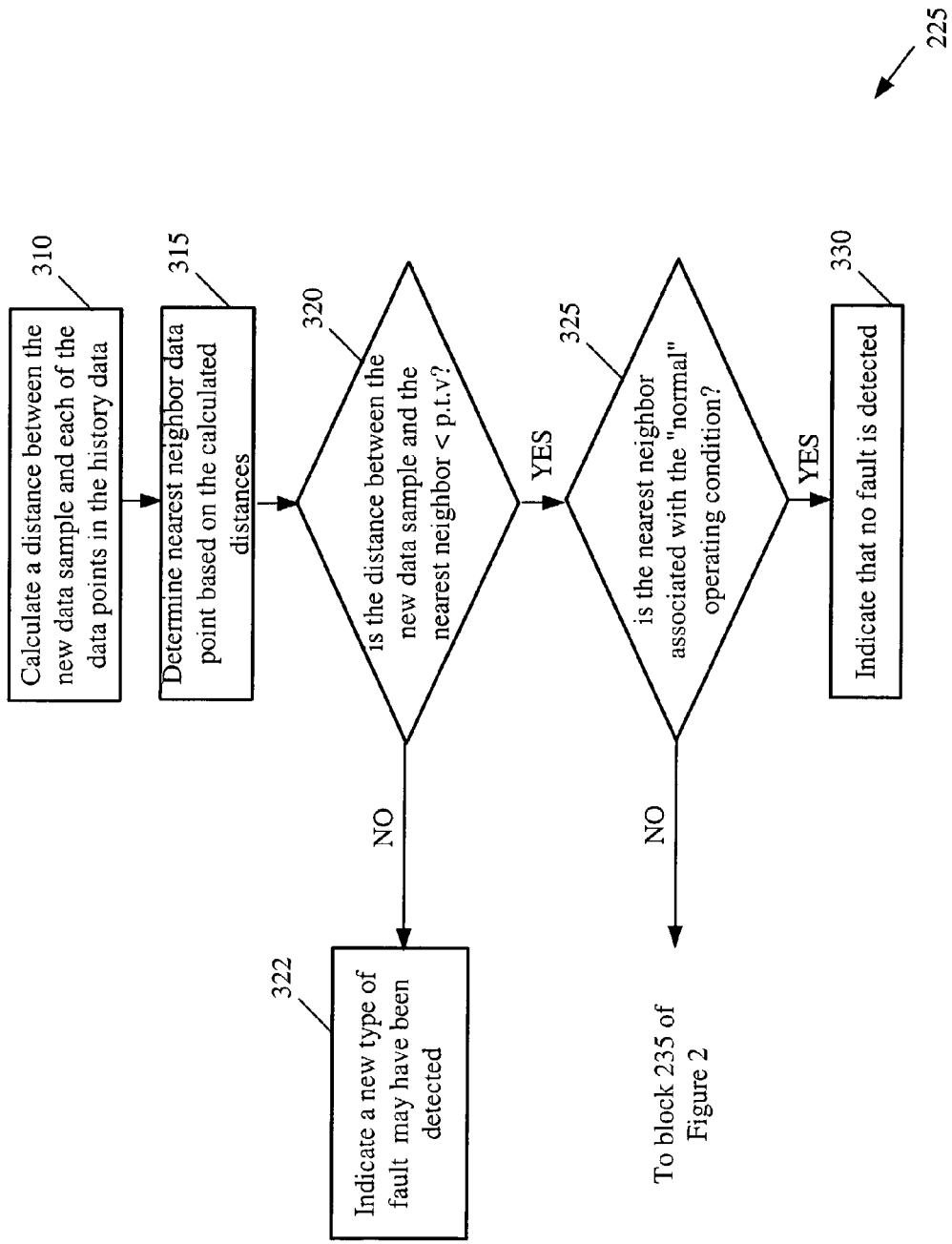
FIG. 3 illustrates a flow diagram of a method for detecting faults that may be implemented in the manufacturing system of FIG. 1, in accordance with one embodiment of the present invention.

The act of determining if a fault occurred (at 225) is described in FIG. 3, in accordance with one embodiment of the present invention. In particular, FIG. 3 illustrates a method of determining whether a fault occurred in the process operation 102 using the nearest neighbor rule (NNR). Using the principles of the NNR, the FDC module 165 calculates (at 310) a distance between the new data sample and each of the data points in the history data.

In the NNR, the known information is a set of m labeled prototypes, denoted by $D^m = \{x_1, x_2, \ldots x_m\}$, where $x_1$ can be a scalar, i.e., $x_1 \in \Re$ or a vector, i.e., $x_1 \in \Re^n$, where $\Re^n$ represents an n-dimension space, n is the dimension of the space, which, in the instant cases corresponds to the number of variables that are measured for each data point in the history data.

Assuming that the history data is representative of an n-dimension space (i.e., $R^n$), and assuming that A and B are two points located in the space $R^n$, then the A and B points may be represented as follows:

$$A = [x_{1a} \, x_{2a} \ldots x_{na}]^T \epsilon R^n$$

$$B = [x_{1b} \, x_{2b} \ldots x_{nb}]^T \epsilon R^n$$

where $x_{1a} \ldots x_{na}$ and $x_{1b} \ldots x_{nb}$ represents the elements of the vectors corresponding to the measured n-dimension variables of data points A and B, respectively. The data point A, for example, may represent the new data sample, while the data point B may represent a data point in the history data, or vice-versa. The letter "T" indicate the matrix transpose.

The distance between A and B may be defined as follows:

$$|AB|_k = \left( \sum_{i=1}^{n} (x_{ia} - x_{ib})^k \right)^{1/k}$$

where the letter "k" may be any desirable positive integer. To calculate the Euclidian distance, for example, "k" may be set to two (2). In the above equation, each dimension or variable is given equal weight. In an alternative embodiment, in calculating the distance between any two data points, a different weight may be assigned to different dimensions (or variables), as indicated by the following equation:

$$|AB|_k = \left( \sum_{i=1}^{n} \omega_i (x_{ia} - x_{ib})^k \right)^{\frac{1}{k}}$$

In the above equation, $\omega_1$ may be utilized to assign a different weight to different dimensions to distinguish the relative importance among the various variables. For example, if temperature measurements are more important than pressure measurements for a given process operation, then the $\omega_1$ value associated with the temperature variable may be assigned a higher value than that of the pressure variable.

Once the distance between the new data sample and the data points of the history table is calculated (at 310) using the above-described equations, the FDC module 165 determines (at 315) the nearest neighbor data point in the history data to the new data sample. The nearest neighbor data point, in one embodiment, is the data point in the history data that is the shortest distance away from the new data sample.

Thus, in the illustrated embodiment, the FDC module 165 may determine the nearest neighbor data point to the new data sample (at 315) by identifying the shortest calculated distance (at 310). In one embodiment, more than one nearest neighbor data points may be determined (at 315).

The FDC module 165 determines (at 320) if the distance between the new data sample and the nearest neighbor data point of the history data is less than a preselected threshold value, where the preselected threshold value represents the greatest distance the new data sample can be from its nearest neighbor data point and still be considered within an acceptable range. For example, it may be possible that the new data sample may be very different from the other data samples of the history data such that it may not be representative of any of the earlier identified operating conditions (at 215 of FIG. 2). The preselected threshold value may be designated by the user based on the implementation objectives. If the distance between the new data sample and the nearest neighbor data point of the history data is greater than the preselected threshold value, then the FDC module 165 indicates (at 322) that a new type of fault may have been detected.

If it is determined (at 320) that the distance between the new data sample and the nearest neighbor data point is less than the preselected threshold value, then the FDC module 165 determines (at 325) if the nearest neighbor data point determined (at 315) is associated with the "normal" operating condition (see step 215 of FIG. 2). If the FDC module 165 determines that the nearest neighbor data point to the new data sample is not associated with the "normal" operating condition (i.e., it is instead associated with the fault type I or II or other operating condition), then the new data sample may indicate that a fault occurred in the processing operation 102. If a fault is detected, the FDC module 165, in one embodiment, classifies (at 235—see FIG. 2) the detected fault. Classifying the fault may comprise identifying which type of fault (e.g., fault type I or II, in the illustrated example) is detected. In one embodiment, the detected fault may be classified based on identifying the particular fault operating condition that is associated with the nearest neighbor data point of the history data of the new data sample.

If the FDC module 165 determines (at 325) that the nearest neighbor to the new data sample is associated with the "normal" operating condition, then the FDC module 165 indicates (at 330) that no fault associated with the process operation 102 has been detected.

Figure 4:
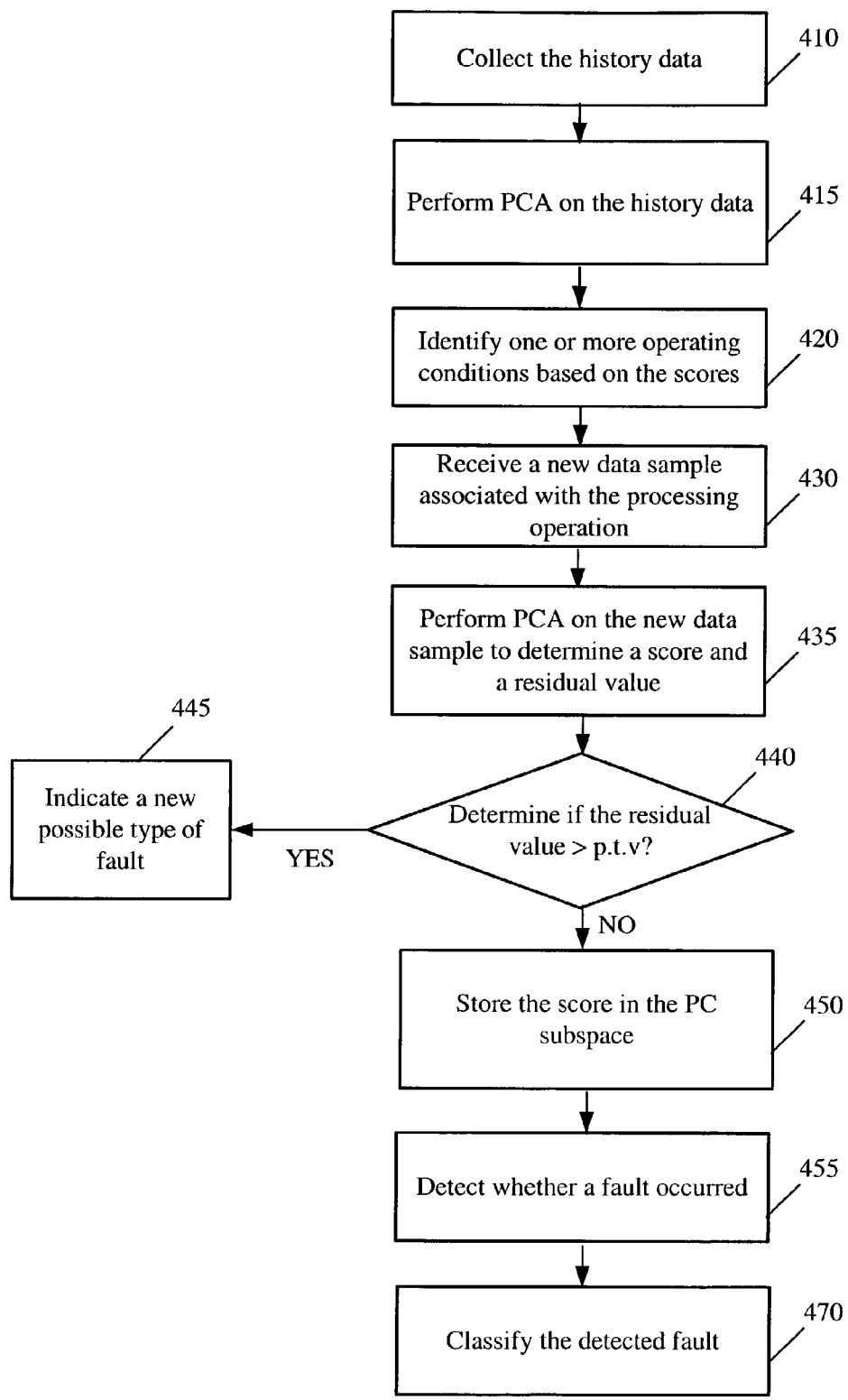
FIG. 4 depicts a flow diagram of an alternative embodiment of a method that may be implemented in the system of FIG. 1 to detect and classify faults, in accordance with one embodiment of the present invention.

Referring now to FIG. 4, a flow diagram of an alternative method that may be implemented in the system 100 of FIG. 1 is illustrated, in accordance with one embodiment of the present invention. In the method of FIG. 4, and as described below, the principal component analysis (PCA) is applied to the history data before the application of the nearest neighbor rule. Applying the PCA in conjunction with the NNR results in several benefits, some of which include a decrease in the computational resources needed for fault detection and/or classification, savings in storage space, and reduction of measurement noise.

The FDC module 165 collects (at 410) history data associated with the process operation 102. The history data can be a collection of numerous data points, where each data point may be representative of multiple variables that are measured or monitored in the process operation 102. For example, if 103 variables are monitored in a given process operation, then each data point, which is said to have 103 dimensions, represents a measurement of 103 different variables.

As more and more variables are monitored, or as the frequency of the monitoring of the variables increases, it becomes increasingly more difficult to process and analyze the history data that is collected over time. Managing and processing data points having an "n" dimension, where "n" is a large number, can be challenging. For this reason, in the illustrated embodiment of the method of FIG. 4, the FDC module 165 performs (at 415) principal component analysis on the history data.

One of the primary purposes of principal component analysis is to reduce the dimensionality of a data set that consists of a large number of interrelated variables, while retaining as much as possible of the variation present in the data set. This is achieved by transforming the original data set to a new set of variables, which are commonly referred to as the principal components. The principal components are typically uncorrelated, and are ordered so that the first few retain most of the variation present in the original variables.

In performing PCA on the history data (at 415), the FDC module 165 linearly transforms the history data (n-dimensional) into a substantially smaller set of uncorrelated variables (k-dimensional, k<<n), the so called "principal components", which represent most of the information in the original history data. There are several other methods to determine the number of PC (k), which should be large enough to cover all the process variation, but also small enough to not cover the process noise. After PCA, the history data are transformed into scores and loadings. Scores are the principal components, and loadings define the direction of principle components in the original coordinate. When k=n, multiplication of score matrix and transpose of loading matrix can reconstruct the original history data.

While any desirable number of principal components may be calculated, for illustration purposes herein, two principal components are calculated for the history data, which means the principal component subspace in the illustrated example has two dimensions. Thus, if the original history data, for example, includes data points having 103 dimensions (i.e., each data point is representative of 103 variables), after performing PCA, that 103-dimension data can be projected into a two-dimensional principal component subspace.

Figure 5:
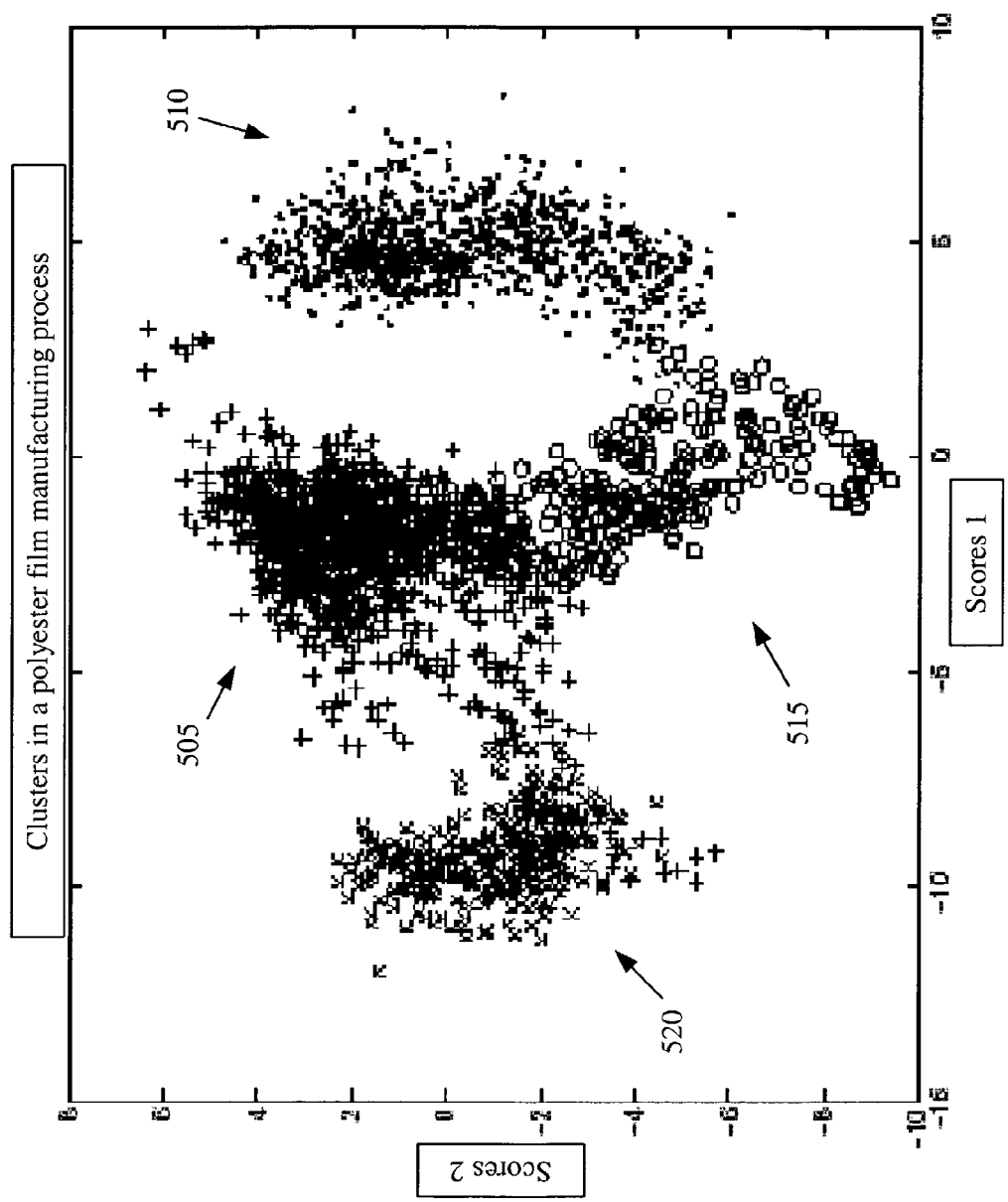
FIG. 5 illustrates an exemplary plot of scores of history data after the application of principal component analysis, in accordance with one embodiment of the present invention.

FIG. 5 illustrates an exemplary plot of a two-dimensional principal component subspace for a polyester film process in which 103 variables are monitored and over 2500 data points are collected. The exemplary plot of FIG. 5 shows over 2500 (history) data points of 103 dimensions being mapped to a two-dimensional principal component subspace. As can been seen, the x-axis represents a first set of scores, labeled "scores 1," and the y-axis represents a second set of scores, marked "scores 2," after the data points of the original history data (in 103 dimensions) have been projected using loading vectors.

Referring again to FIG. 4, upon performing PCA on the history data (at 415), one or more operating conditions are identified (at 420) based on the scores of the history data. The scores may generally reflect some patterns that are indicative of various operating conditions of the process operation 102. For example, as shown in FIG. 5, there are generally four clusters 505, 510, 515, and 520 of scores. Each cluster 505, 510, 515, and 520 in the illustrated example represents an operating condition, ranging from a "normal" operating condition to various types of fault conditions. In particular, the first cluster 505 represents a "normal" operating condition, the second cluster 510 represents a "fault type I" operating condition, the third cluster 515 represents a "fault type II" operating condition, and the fourth cluster 520 represents a "fault type III" operating conditions. Thus, based generally on the value of scores, one or more operating conditions may be identified (at 420). It should be appreciated that although FIG. 5 is limited to normal, Type I, Type II and Type II operation conditions, in alternative embodiments, there may be a greater or lesser number of operating conditions.

Although not so limited, the acts of collecting history data (at 410), performing PCA on the history data (at 415), and identifying one or more operating conditions based on the scores (at 420) of FIG. 4 are generally performed before the process operation 102 is performed, although the present invention is not and should not be considered as limited to performing these acts in this particular sequence. Thus, based on the collection of scores of the history data and identifying the one or more operating conditions, the FDC module 165 is capable of detecting and classifying faults that are associated with the process operation 102, as described below.

In the method of FIG. 4, the FDC module 165 receives (at 430) a new data sample associated with the process operation 102. That is, as (or after) the process operation 102 is performed, the desired variables are measured and a new data sample representative of the measured variables is provided to the FDC module 165. The new data sample received (at 430) by the FDC module 165 may have a high dimension (e.g., 103 dimensions in the illustrated example). To reduce this high dimensionality, the FDC module 165 performs (at 435) PCA on the new data sample and determines a score and a residual value. The residual value, as is understood by those skilled in the art, represents the "noise" included in the original 103 measurements.

The FDC module 165 determines (at 440) if the residual value (from performing PCA on the new data sample) is greater than a preselected threshold value. A residual value that is greater than the preselected threshold value may be an indication that the new data sample represents invalid data or corresponds to an unknown operating condition. Thus, if it is determined (at 440) that the residual value is greater than the preselected threshold value, then the FDC module 165 indicates (at 445) that a new possible type of fault may have been detected.

If it is determined (at 440) that the residual value is less than the preselected threshold value, then the FDC module 165, in one embodiment, stores (at 450) the previously determined score of the new data sample in the principal component subspace. Storing the score calculated for each received new data sample keeps the principal component subspace updated as new scores are calculated. A periodic or continual update of the principal component subspace may be useful in cases where the process operation 102 tends to drift. If the process operation 102 is not prone to drifting, then it may not be desirable to update the principal component subspace with the new scores.

The FDC module 165 detects (at 455) whether a fault associated with the process operation 102 occurred, and, if so, the FDC module 165 classifies (at 470) the detected fault. The act of determining whether a fault occurred (at 455) can be performed using the nearest neighbor rule, in a manner similar to that described earlier in FIG. 3. Instead of applying the NNR on the original data samples that are typically of a higher dimension, as is done in FIG. 3, in this embodiment, the NNR is applied to the score of the new data sample and the scores of the history data. Because the scores in the principal component subspace are in a lower dimension than the original data points, it is possible to detect and classify faults using fewer calculations. Faults may be detected by determining whether the score (of the history data) that is the nearest neighbor to the score of the new data sample is associated with the "normal" operating condition. If the nearest neighbor to the score of the new data is associated with the "normal" operating condition, then that is an indication that no fault associated with the process operation 102 is detected.

If, however, the nearest neighbor to the score of the new data is not associated with the "normal" operating condition, then that is an indication that a fault associated with the process operation 102 is detected. The FDC module 165 may classify the detected fault by identifying which type of fault (e.g., fault type I, II, or III in the illustrated example) is detected. In one embodiment, the detected fault may be classified based on identifying the particular fault operating condition that is associated with the nearest neighbor score (of the history data) to the score of the new data sample.

In summary, one or more embodiments of the present invention utilize PCA in conjunction with the NNR to detect and/or classify faults. The combined use of these techniques has several advantages. First, because PCA can be applied to the entire history data to reduce the dimensionality of the variables, it is possible to rely on most, if not all, of the data points for analysis purposes. In this manner, information carried by the measured variables is not lost, as would be the case in conventional techniques where some variables may be ignored over other variables. Second, PCA is conducive to reducing measurement noise, which reduces the number of the false faults detected. Additionally, because PCA reduces a high-dimensional data to lower dimensional data, the storage space requirements for storing the scores (of the history data) can be reduced. Furthermore, because of the reduced dimensionality of the history data, lesser computational power is needed to process the lower dimension data for the purposes of detecting and classifying faults.

The various system layers, routines, or modules may be executable by the control unit 172 (see FIG. 1). As utilized herein, the term "control unit" may include a microprocessor, a microcontroller, a digital signal processor, a processor card (including one or more microprocessors or controllers), or other control or computing devices. The storage unit 170 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for identifying a region in which a process operation operates based on a collection of history data that is representative of a plurality of variables associated with the process operation, where the history data is n-dimensional, the method comprising:
   transforming the history data into a data set that is m-dimensional, where "m" is lower than "n," and wherein the data set represents a plurality of regions in which the process operation can operate;
   receiving a data sample representative of one or more measurements of one or more variables associated with the process operation;
   transforming the data sample into a "m" dimensional data sample;
   determining a distance between the transformed data sample and one or more data points of the data set; and
   identifying at least one of the plurality or regions in which the process operation may be operating based on the determined distance.

2. The method of claim 1, wherein the plurality of regions each represent an operating condition, wherein identifying the at least one region comprises:
   determining a shortest distance between the transformed data sample and the one or more data points of the data set; and
   determining that the operating condition associated with the data point that is the shortest distance to the transformed data sample.

3. The method of claim 1, wherein determining the distance comprises determining the distance using the nearest neighbor rule.

4. The method of claim 2, further indicating that the transformed data point is not associated with any of the plurality of regions based on determining that the shortest distance between the transformed data sample and the one or more data points is greater than a preselected threshold value.

5. The method of claim 1, wherein one of the plurality of regions represents a range of normal operating condition of the process operation and another represents a range of abnormal operating condition of the process operation.

6. The method of claim 1, wherein the act of transforming comprises performing principal component analysis on the history data.

7. The method of claim 6, wherein the act of transforming comprises transforming the history data into the data set that is two dimensional.

8. The method of claim 1, wherein the process operation comprises two or more process operations.

9. The method of claim 8, wherein the process operation comprises a semiconductor manufacturing process operation and wherein the history data is collected from at least one of the process operation and one or more processes representative of the process operation.

10. An apparatus for identifying a region in which a manufacturing process is operating based on a collection of history data that is representative of a plurality of variables associated with a process operation, where the history data is n-dimensional, the apparatus comprising:
    an interface adapted to receive a data sample representative of one or more variables measured in the manufacturing process; and
    a controller communicatively coupled to the interface, the controller adapted to:
    transform the history data into a data set that is m-dimensional, where "m" is lower than "n," and wherein the data set represents a plurality of regions in which the process operation can operate;
    transform the data sample into a "m" dimensional data sample;
    determine a distance between the transformed data sample and one or more data points of the data set; and
    identify at least one of the plurality of regions in which the manufacturing process may be operating based on the determined distance.

11. The apparatus of claim 10, wherein the plurality of regions each represent an associated operating condition, wherein the controller is adapted to:
    determine a shortest distance between the transformed data sample and the one or more data points of the data set; and
    determine that the operating condition associated with the data point having the shortest distance with the transformed data sample does not represent a "normal" operating condition.

12. The apparatus of claim 10, wherein the history data is representative or the plurality of variables associated with the manufacturing process, and wherein the controller is adapted to determine the distance comprises determining the distance using the nearest neighbor rule.

13. The apparatus of claim 11, wherein the controller is further adapted to indicat that the data point is not associated with any of the plurality of regions based on determining that the shortest distance between the data sample and the one or more data points is greater than a preselected threshold value.

14. The apparatus of claim 10, wherein the manufacturing process comprises more than one process operation.

15. The apparatus of claim 10, wherein the controller is adapted to perform principal component analysis on the history data.

16. The apparatus of claim 15, wherein the controller is further adapted to perform principal component analysis on the data sample to determine a score in an "m" dimensional space.

17. The apparatus of claim 16, wherein the manufacturing process is a semiconductor manufacturing process operation.

18. An apparatus for identifying a region in which a manufacturing process is operating based oil a collection of history data that is representative of a plurality of variables associated with a process operation, where the history data is n-dimensional, the apparatus comprising:
    means for transforming the history data into a data set that is m-dimensional, where "m" is lower than "n," and wherein the data set represents a plurality of regions in which the process operation can operate;
    means for receiving a data sample representative of measurements of one or more variables associated with the manufacturing process;
    means for transforming the data sample into a "m" dimensional data sample;
    means for determining a distance between the transformed data sample and one or more data points of the data set; and
    means for identifying at least one of the plurality of regions in which the manufacturing process may be operating based on the determined distance.

19. An article for identifying a region in which a process operation is operating based on a collection of history data that is representative of a plurality of variables associated with the process operation, the article comprising one or more machine-readable storage media containing instructions that when executed enable a processor to:

transforming the history data into a data set of a lower dimensional space, wherein the data set represents a plurality of regions in which the process operation can operate;

receive a data sample representative of measurements of variables that are associated with the process operation;

perform principal component analysis on the data sample to determine a score;

determine a score of a history data that is nearest to the score of the data sample;

determine an operating condition associated with the score that is nearest to the score of the data sample; and detect a fault associated with the process operation based on the determined operating condition.

20. The article of claim 19, wherein the instructions when executed enable the processor to determine the score that is nearest to the score of the data sample using the nearest neighbor rule.

21. The article of claim 19, wherein the instructions when executed enable the processor to store the score in a principal component subspace associated with the history table.

22. The article of claim 19, wherein the instructions when executed enable the processor to perform principal component analysis on the data sample to determine a residual value, and, if the residual value is greater than a preselected threshold value, to indicate that an unidentified type of fault may have been detected.

23. The article of claim 19, wherein the instructions when executed enable the processor to classify the fault based on the determined operating condition.

24. The article of claim 19, wherein the instructions when executed enable the processor to determine if the fault condition is one of a "normal" or "faulty" operating condition.

25. A system for identifying a region in which a process operation is operating based on a collection of history data that is representative of a plurality of variables associated with the process operation, where the history data is n-dimensional, the system comprising:

a processing tool adapted to perform a process operation; and a fault detection and classification unit adapted to:

transform the history data into a data set that is m-dimensional, where "m" is lower than "n," and wherein the data set represents a plurality of regions in which the process operation can operate;

receive a data sample representative of one or more variables measured in the process operation;

transform the data sample into a "m" dimensional data sample;

determine a distance between the transformed data sample and one or more data points of the data set; and detect a fault associated with the process operation based on the distance.

26. The system of claim 25, wherein the fault detection and classification unit is adapted to perform principal component analysis on the history data and the data sample.

27. The system of claim 25, wherein the fault detection and classification unit is adapted to determine the distance based on the nearest neighbor rule.

* * * * *

UNITED STATES PATENT AND TRADEMARK OFFICE
CERTIFICATE OF CORRECTION

PATENT NO. : 7,043,403 B1
APPLICATION NO. : 10/234755
DATED : May 9, 2006
INVENTOR(S) : Jin Wang and Gregory A. Cherry It is certified that error appears in the above-identified patent and that said Letters Patent is hereby corrected as shown below:

Claim 1: Column 11, line 18 change ""or" [regions] to "of";

Claim 12: Column 12, line 21, change "or" [the plurality] to "of";

Claim 13: Column 12, line 26, change "indicat" to "indicate"; and

Claim 18: Column 12, line 45, change "oil" to --on--.

Signed and Sealed this

Twenty-eighth Day of November, 2006

JON W. DUDAS
*Director of the United States Patent and Trademark Office*